United States Patent [19]
Shepherd et al.

[11] Patent Number: 5,509,686
[45] Date of Patent: Apr. 23, 1996

[54] INFLATABLE RESTRAINT SYSTEM WITH GAS AUGMENTATION

[75] Inventors: Jeffrey A. Shepherd, Fairborn; Michael W. Donegan, Bellbrook, both of Ohio

[73] Assignee: General Motors Corporation, Detroit, Mich.

[21] Appl. No.: 878,712

[22] Filed: May 4, 1992

[51] Int. Cl.$^6$ .................................................. B60R 21/30
[52] U.S. Cl. .......................................... 280/738; 280/740
[58] Field of Search ...................... 280/740, 728, 280/736, 738, 742, 728.1; 222/3

[56] References Cited

U.S. PATENT DOCUMENTS

| | | | |
|---|---|---|---|
| 3,880,447 | 4/1975 | Thorn et al. | 280/740 |
| 4,043,572 | 8/1977 | Hattori et al. | 280/738 |
| 4,153,273 | 5/1979 | Risko | 280/740 |
| 4,332,398 | 6/1982 | Smith | 280/740 X |
| 4,817,828 | 4/1989 | Goetz | 222/3 |
| 4,846,368 | 7/1989 | Goetz | 222/3 |
| 4,950,458 | 8/1990 | Cunningham | 280/736 X |
| 5,058,921 | 10/1991 | Cuevas | 280/736 X |
| 5,060,973 | 10/1991 | Giovanetti | 280/736 |
| 5,085,465 | 2/1992 | Hieahim | 280/738 |
| 5,131,680 | 7/1992 | Coultas et al. | 222/3 X |

FOREIGN PATENT DOCUMENTS 2022194  12/1979  United Kingdom ................... 280/742

*Primary Examiner*—Margaret A. Focarino
*Assistant Examiner*—Peter C. English
*Attorney, Agent, or Firm*—Kathryn A. Marra; Charles E. Leahy

[57] ABSTRACT

An air bag assembly for an inflatable passenger vehicle restraint system comprises an inflatable air bag, a thrust neutral inflator for generating pressure gas and a reaction canister. The inflator has a cylindrical casing with a plurality of holes on opposite sides for discharging the gas to inflate the air bag. The reaction canister houses the inflator and has a part-cylindrical bottom wall terminating in upstanding side walls which operatively connect the inflator to the air bag. A plurality of aspiration holes are formed in the reaction canister side walls. A part-cylindrical baffle is mounted in the canister between the inflator and the bottom wall and has an outlet to direct gas discharged from the inflator away from the walls and to the air bag. Ambient air is aspirated through the aspirator holes upon gas delivery from the inflator discharge ports to augment the volume of gas delivered to the air bag. The aspirator holes also serve as pressure relief vents for the air bag.

4 Claims, 3 Drawing Sheets

INFLATABLE RESTRAINT SYSTEM WITH GAS AUGMENTATION

BACKGROUND OF THE INVENTION

This invention relates generally to passenger vehicle inflatable restraints and, more particularly, to an inflatable restraint system including means for augmenting gas delivered from an inflator to an air bag.

Many passenger vehicles manufactured today are equipped with supplemental inflatable restraints for the vehicle driver, commonly known as air bags. An increasing number of vehicles are being equipped with air bags for the front seat passenger. This air bag is part of an air bag assembly which includes an inflator attached to the air bag and a reaction canister housing the inflator. The air bag is mounted on the canister above the inflator.

This air bag assembly is located in a recess in the vehicle instrument panel for deployment of the air bag through an instrument panel opening which is normally closed by a cover door. The inflator is actuated by a signal received from a vehicle deceleration sensor to discharge pressure gas through discharge ports into the air bag interior. Upon inflation, the air bag forces the cover door open and deploys into the passenger compartment rearwardly of the instrument panel.

Inflators utilized in this type of installation generally have a cylindrical outer casing. The reaction canister has a U-shaped bottom portion, comprising part-cylindrical bottom and side walls which house the inflator. The canister has a top opening that connects to the air bag interior.

Various types of cylindrical inflators are used in this arrangement. In one, the canister is mounted on the bottom wall and gas discharge ports are located on only the side of the inflator facing the air bag opening. This is known as a directed thrust inflator and is characterized by having a downward resultant reaction force when actuated. It also produces an area of reduced pressure between the sides and bottom of the inflator and canister upon actuation because of the directed thrust.

Because air bags are utilized to give protection to occupants in the event of sudden vehicle deceleration, the air bags must deploy quickly. This requires that the inflator generate great quantities of pressure gas and deliver it to the air bag immediately upon actuation to enable deployment of a properly pressurized air bag within a predetermined short time span.

Another type of inflator has been developed, which features gas discharge ports located on all, or at least diametrically-opposite sides of the casing. This arrangement of the discharge ports makes the inflator thrust neutral, since the gas discharge forces on opposite sides of the inflator cancel, with no resultant forces. This type of inflator is usually end mounted to the end walls of a reaction canister having a U-shaped cross section with a rectangular top opening. The inflator is mounted in spaced relation to the bottom and side walls which direct all gas discharged upwardly through the canister top opening into the air bag. Upon actuation, there is no reduced pressure area between inflator and canister, since gas is discharged from both sides of the inflator.

An inflator arrangement for increasing gas output is illustrated in U.S. Pat. No. 4,846,368—Goetz in which a directed thrust inflator is used in a reaction canister having holes in its side walls. These holes are normally covered by flexible flaps. Upon actuation of the inflator, the discharge of pressure gas from the canister causes a pressure reduction around the sides of the canister, due to the Bernoulli effect. This resultant pressure imbalance forces the flaps inwardly to aspirate ambient air to the canister. This supplemental ambient air augments the gas discharged by the inflator, increasing the total gas volume available to inflate the deploying air bag. Should pressure rise above a desired level in the Goetz arrangement, these flexible flaps will close. Auxiliary rear vent holes are provided.

A similar arrangement is shown in U.S. Pat. No. 4,928,991—Thorn which also utilizes directed thrust gas generation and side wall aspiration holes covered by a flap. In both of these patents, an increase in air bag pressure causes the flaps to close. This requires other means of accommodating pressure increases. Also, the use of directional gas generators produces a reaction force on the inflator, requiring a rugged mounting arrangement.

The mere substitution of a thrust neutral, non-directional inflator in the Goetz and Thorn devices would not function the same, since the necessary area of reduced pressure would not exist and the flaps would not open.

It would be desirable to provide a simplified air bag installation which uses a thrust neutral inflator that enables the augmentation of discharge gas with ambient air.

It would also be desirable to provide such an installation which provides relief for excessive air bag pressure.

SUMMARY OF THE INVENTION

It is therefore an object of this invention to provide a simplified air bag installation which uses a thrust neutral inflator that enables the augmentation of discharge gas with ambient air.

It is another object of this invention to provide such an installation which provides relief for excessive air bag pressure.

Accordingly, this invention features an air bag assembly for an inflatable passenger vehicle restraint system comprising an inflatable air bag and a thrust neutral inflator for generating pressure gas and having a casing with a plurality of holes for discharging the gas to inflate the air bag. A reaction canister houses the inflator and has walls defining an outlet for operatively connecting the inflator to the air bag for delivering gas therethrough. Gas augmentation means is provided to augment the generated gas with ambient air. A plurality of aspiration holes are located in the reaction canister walls adjacent the inflator. A baffle mounted in the canister between the inflator and the aspirator holes has an outlet to direct gas discharged from the inflator to the outlet. Upon discharge of pressure gas through the outlet, ambient air is aspirated through the aspirator holes to augment the volume of gas delivered to the air bag.

In one aspect, this invention features an air bag assembly for an inflatable passenger vehicle restraint system which comprises an inflatable air bag, and a thrust neutral inflator for generating pressure gas and having a cylindrical casing with a plurality of holes for discharging the gas to inflate the air bag. A reaction canister houses the inflator and has a part-cylindrical bottom wall which terminates in upstanding side walls terminating in a discharge opening operatively connecting the inflator to the air bag. Gas augmentation means for augmenting the discharged pressure gas comprises a plurality of aspiration holes located in the reaction canister side walls and a part-cylindrical baffle mounted in the canister between the inflator and the bottom wall and has an outlet to direct gas discharged from the inflator away from the canister walls and to the air bag through the canister discharge opening. Ambient air is aspirated through the aspirator holes upon gas delivery from the discharge ports to augment the volume of gas delivered to the air bag.

Preferably, the aspirator holes are constantly open, thus enabling pressure relief for the air bag therethrough, the baffle is rigid and spaced from the reaction canister walls to provide a passageway for ambient air to flow from the aspirator holes to the air bag, and the baffle is closely spaced from the inflator casing a distance of about 3–5 mils.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
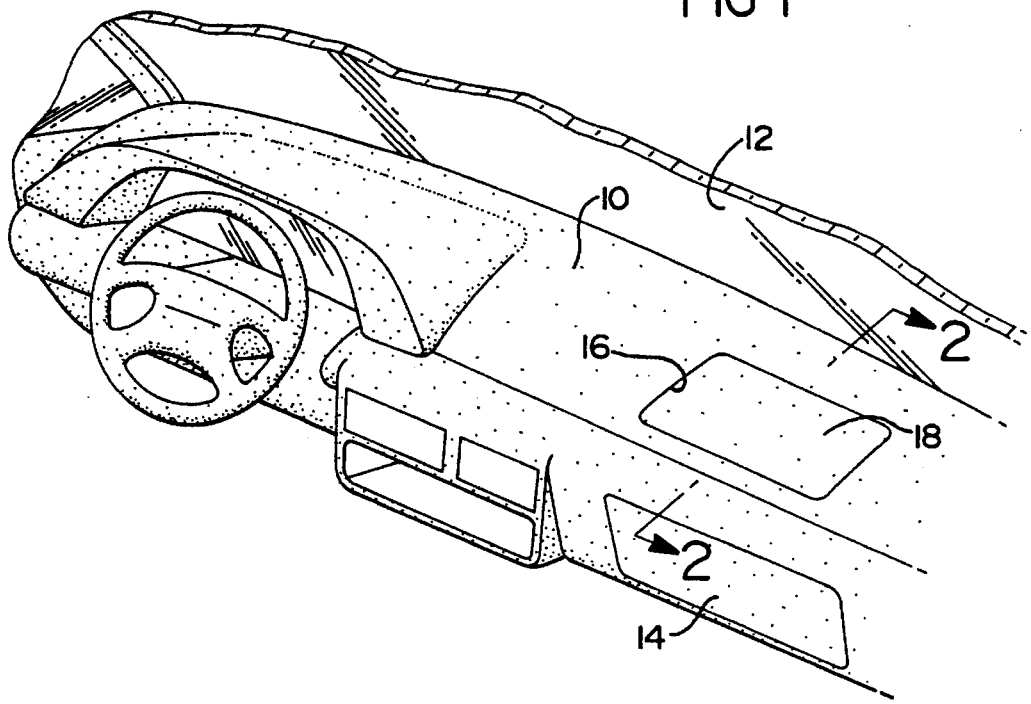
FIG. 1 is a perspective view of a passenger vehicle interior having an instrument panel with an air bag cover door closing an air bag deployment opening.

Referring to FIG. 1 of the drawings, a passenger vehicle includes an instrument panel 10 mounted in the vehicle interior behind a windshield 12. Panel 10 includes the usual glove box which is closed by a glove box door 14. An air bag deployment opening 16 is formed in the top of panel 10 above glove box door 14. Opening 16 is normally closed by a cover door 18.

Figure 2:
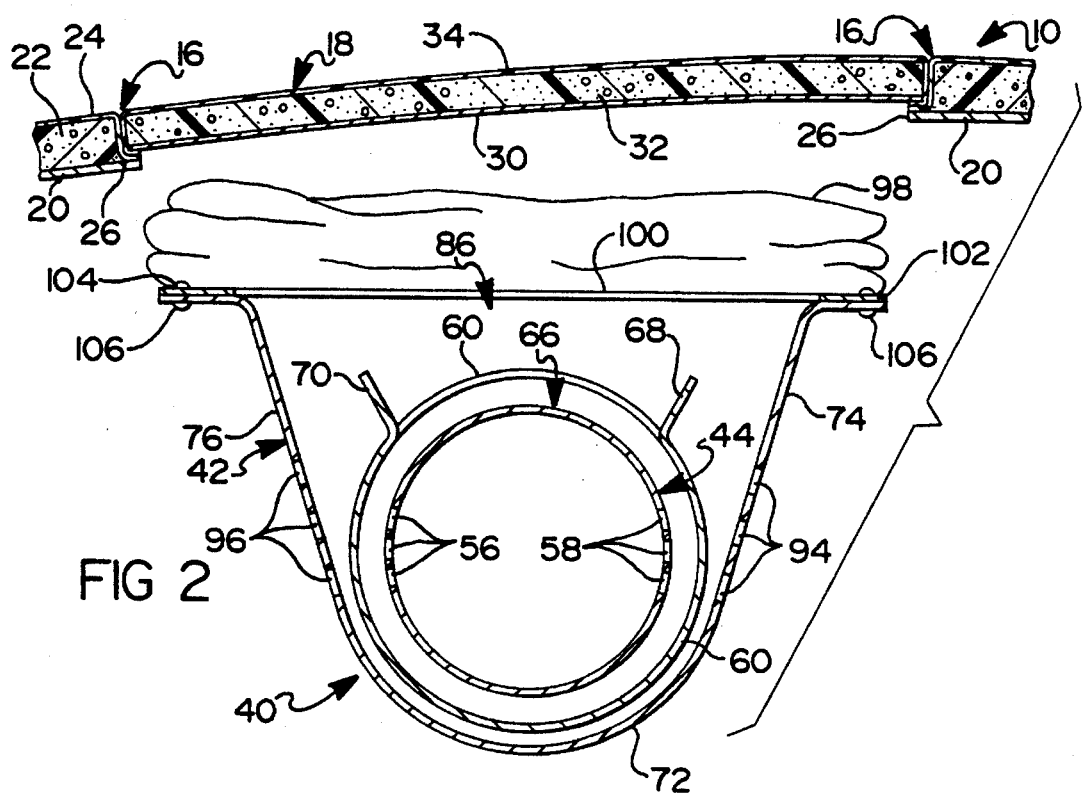
FIG. 2 is an enlarged sectional view taken along line 2—2 of FIG. 1, illustrating a preferred embodiment of the inflatable restraint system of this invention, shown in ready mode prior to actuation.

As shown in FIG. 2, instrument panel 10 comprises a covering constructed of a supporting substrate 20 for a foam padding layer 22 which has a decorative skin 24. Opening 16 is bounded by a peripheral flange 26 of substrate 22. Cover door 18 is of similar construction as instrument panel 10 so as to form a continuation of it, although being separate and separable from it. Door 18 includes a supporting substrate 30 for a foam padding layer 32 which has a decorative skin 34 preferably identical to skin 24.

Located beneath opening 16 is an air bag assembly 40 which includes a steel reaction canister 42 that is mounted to the support structure for the instrument panel, not shown. A cylindrical steel or aluminum air bag inflator 44 has a main body portion 45 bounded by an enlarged collar or head 46 at its inner end and an enlarged collar or head 48 at its outer end. Collar 46 is sized to extend radially about 3–5 mils beyond the surface of main body 45.

Figure 3:
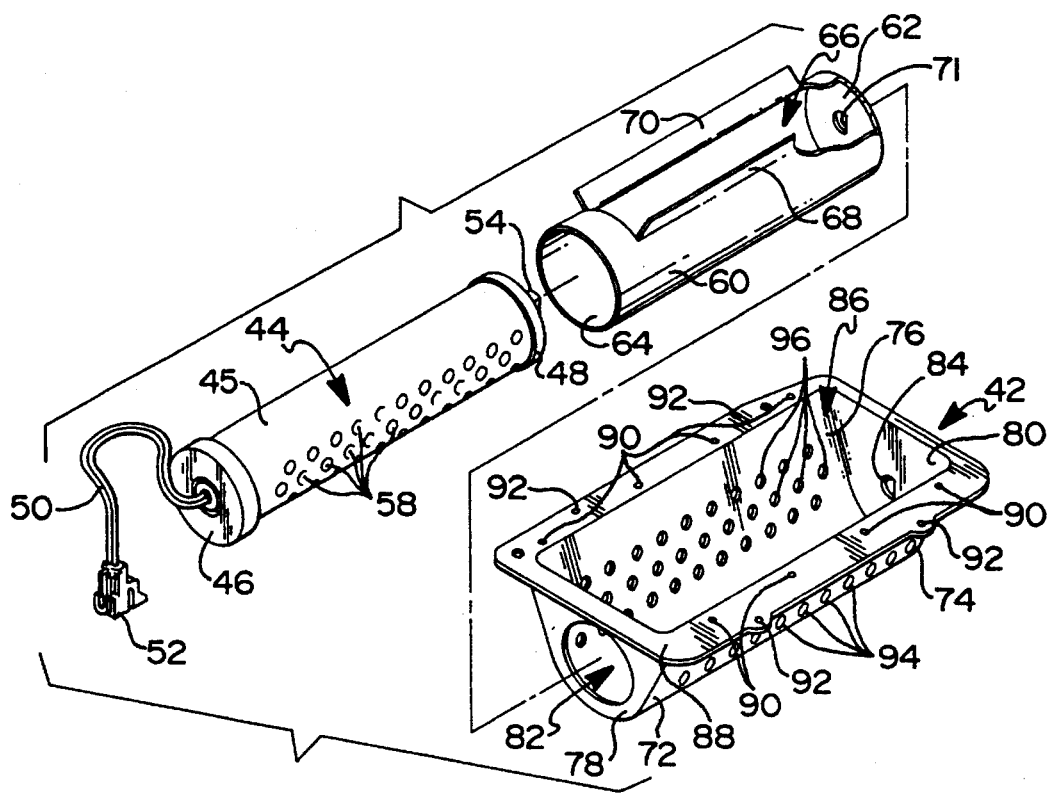
FIG. 3 is an exploded perspective view of the inflatable restraint system of this invention, illustrating details of the inflator, reaction canister and baffle.

Referring now to FIG. 3, an electrical control wire 50 with a terminal connection 52 extends from the inner end. A mounting lug 54 extends from the outer end of inflator 44.

In FIG. 2, inflator body 45 contains a plurality of gas discharge holes 56 along one side and another plurality of gas discharge holes 58 along the opposite side.

Figure 4:
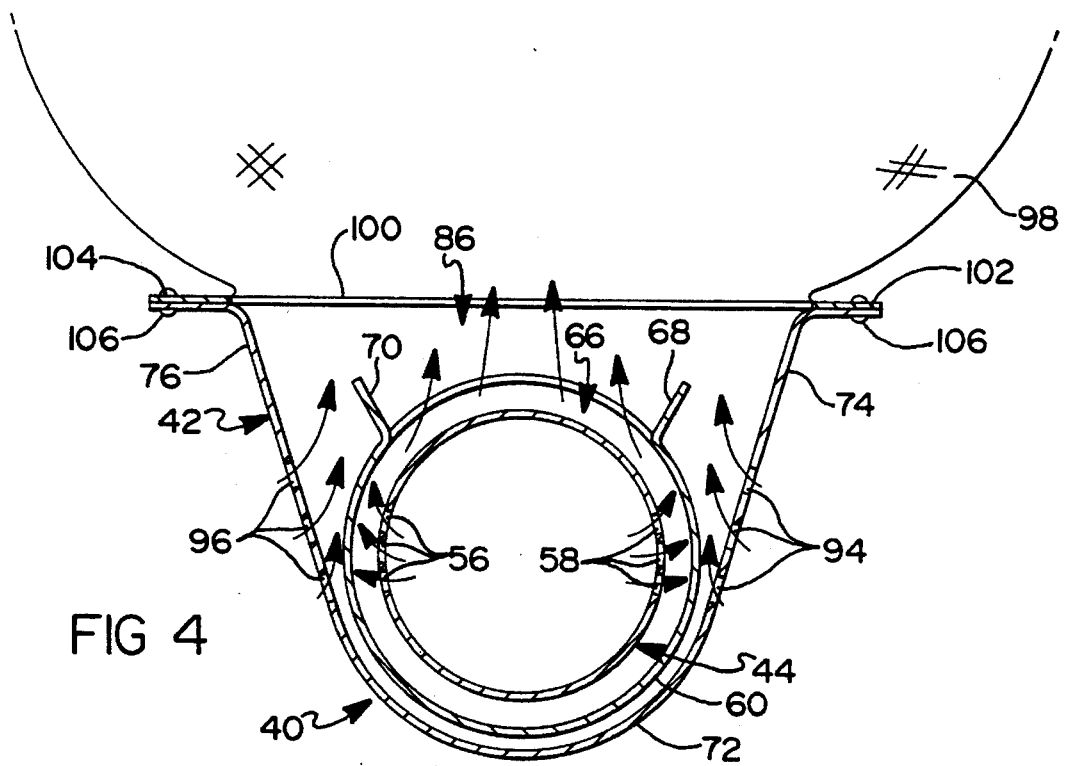
FIG. 4 is a view similar to FIG. 2, but illustrating the restraint system in bag deployment mode, with the air bag being inflated by pressure gas generated by the inflator, according to this invention.
Figure 5:
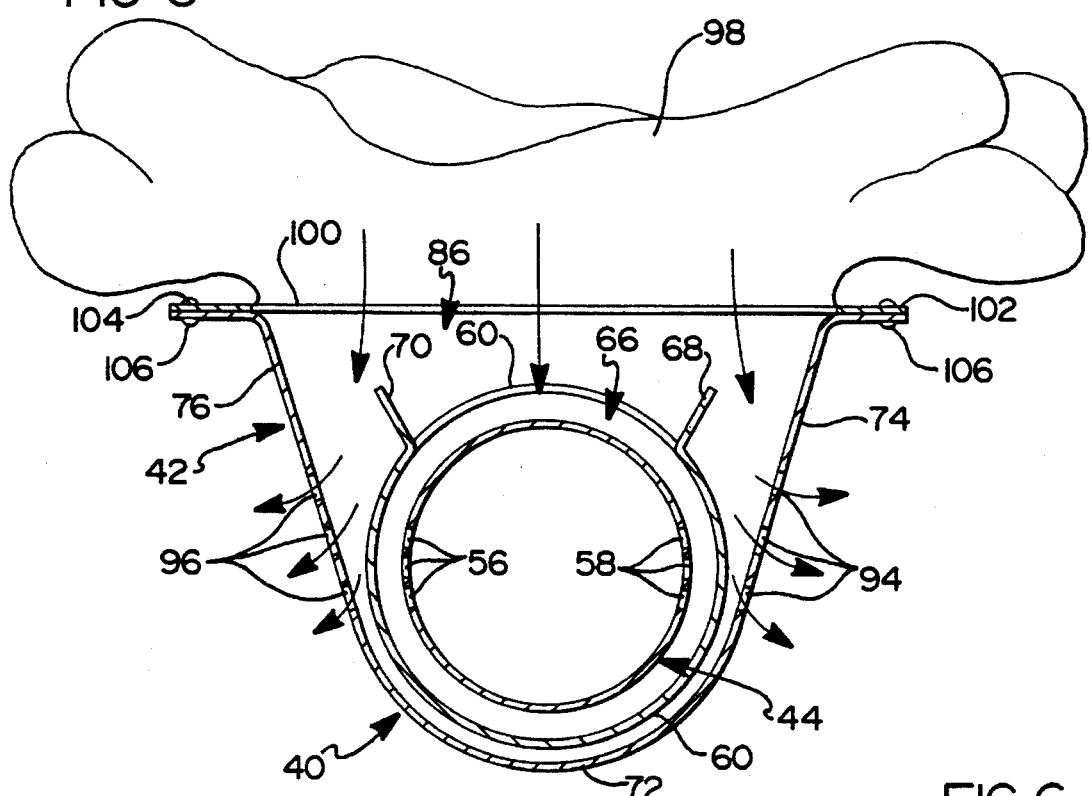
FIG. 5 is a view similar to FIG. 4, but showing the restraint system in venting mode.

A generally cylindrical steel baffle 60 includes inner end wall 62 and an opposite end circular opening 64 which flank a rectangular gas discharge opening 66. Discharge opening 66 is bordered by a pair of longitudinal wing-like flaps 68 and 70. As shown in FIGS. 2, 4 and 5, flaps 68 and 70 are angled outwardly to reduce losses caused by turbulent gas flow, thereby optimizing aspiration efficiency. Baffle 60 has an inside diameter substantially the same as the outside diameters of inflator collars 46 and 48. End wall 62 includes a lug-receiving and orientation opening 71.

Reaction canister 42 is a unitary steel container having an elongated, open U shape. A curved bottom wall 72 connects to straight diverging side walls 74 and 76 that are closed by parallel end walls 78 and 80. End wall 78 has a circular opening sized to receive inflator collar 46. End wall 80 includes a lug retention and orientation opening 84 sized and shaped to receive mounting lug 54.

Side walls 74 and 76 and end walls 78 and 80 define a rectangular top gas discharge opening 86 bordered by a peripheral mounting flange 88. A series of air bag mounting holes 90 are formed in flange 88, while a series of mounting holes 92 are provided to mount the canister to vehicle structure, not shown. A series of aspiration holes 94 are formed along the length of side wall 74; a similar series of aspiration holes 96 are formed along side wall 76.

An air bag 98 is enclosed except for a central opening 100 that mates with canister gas discharge opening 86. Opening 100 is bounded by an air bag retainer ring 102 sewn to air bag 98. Retainer ring 102 contains mounting holes 104 that mate with flange holes 90 to receive rivets 106 to secure air bag 98 to reaction canister 42.

The air bag assembly 40 is assembled as follows, with reference to FIG. 3. Baffle 60 is inserted through opening 86 into the interior of canister 42. The outer end collar 48 of inflator 44 is then inserted through end wall opening 82, through baffle opening 64, the body, and into the end portion 62 of baffle 60. Inflator 44 is inserted until lug 54 enters openings 71 and 84 and the end of inflator 44 abuts end walls 62 and 80.

The proper orientation of the inflator 44, baffle 60 and canister 42 as shown in FIG. 2 is assured by the above structure. The mating of the lug 54 and openings 71 and 84 function to orient the baffle 60 relative to the inflator 44 and to orient both the inflator and the baffle relative to the canister. This assures that the gas discharge holes 56 and 58 are disposed horizontally and the baffle gas discharge opening 66 is vertical.

As mentioned previously, the radius of collar 46 extends a distance of about 3–5 mills beyond the surface of the body of inflator 44. Since the baffle is essentially slip fit onto collar 46, the inflator gas discharge holes are spaced about 5 mils from the wall of baffle 60.

Figure 6:
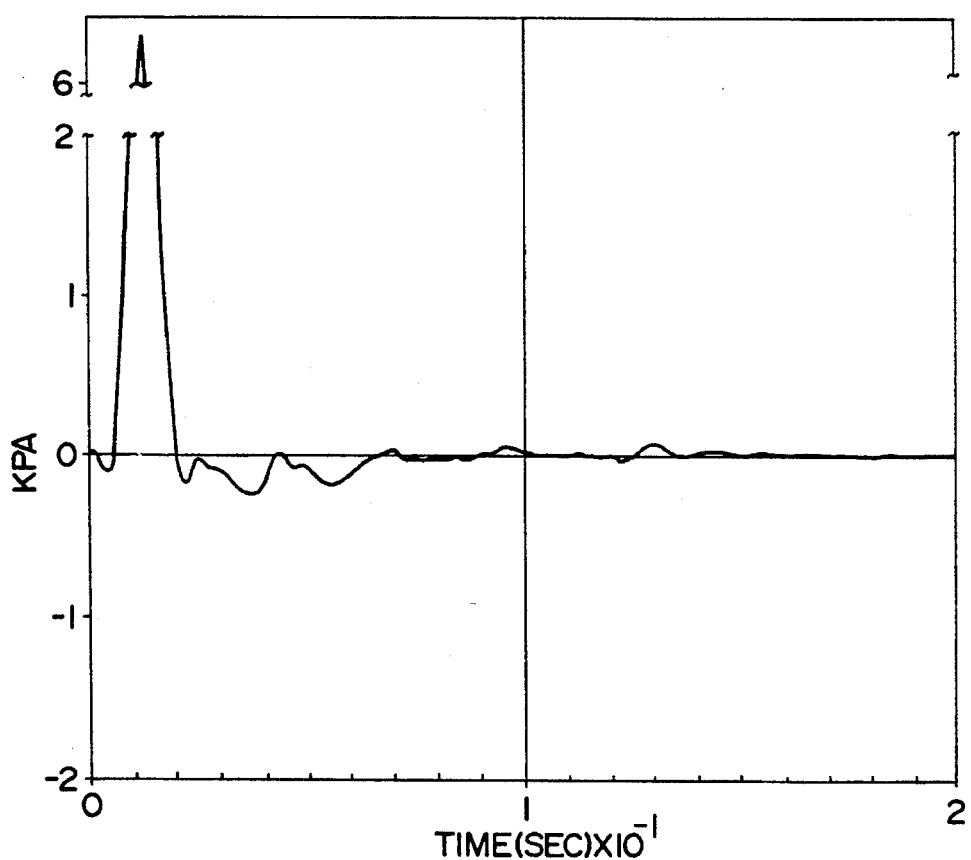
FIG. 6 is a chart showing housing internal pressure, measured in kilopascals, as a function of time, measured in seconds, during air bag deployment.

Operation will now be explained with particular reference to FIGS. 2 and 4–6. Just prior to actuation of the inflator by a vehicle-mounted deceleration detector, the air bag assembly is as depicted in FIG. 2, with cover door 18 closing deployment opening 16. Upon actuation, the inflator rapidly discharges pressure gas through holes 56 and 58. Baffle 60 directs this gas upwardly through discharge openings 66 and 86 into the interior of air bag 98, as illustrated in FIG. 4. Air bag 98 rapidly fills and presses against the bottom of cover door 18, which resists, as pressure rises rapidly, as indicated in FIG. 6, which illustrates air bag pressure in an actual test.

As illustrated, for an exemplary inflator, the force exerted by air bag 98 peaks at a breakout force of about 6.2 KPa at about 11.4 milliseconds at ambient temperature. Air bag 98 then forces door 18 open and begins deploying through opening 16, as shown in FIG. 4. This sudden deployment causes a rapid pressure drop around baffle 60, as the air bag deploys faster than inflator 44 can discharge gas. This pressure drop aspirates ambient air through the series of holes 94 and 96 in canister side walls 74 and 76 to supplement the gas filling air bag 98. This supplementation of the gas filling air bag 98 by aspirated ambient air quickly stabilizes pressure within air bag 98 to a predetermined amount at about the 70 millisecond mark (see FIG. 6). It will be understood that inflators having different inflation characteristics may provide a different curve in the graph of FIG. 6.

Should air bag 98 prematurely encounter an obstruction during deployment, pressure will rise quickly (not shown) above the predetermined amount. This will immediately pressurize the canister 42. Since the series of holes 94 and 96 are continuously uncovered, pressure relief is immediate, as gas is vented to reduce pressure. Upon deactuation of inflator 44, air bag 98 can be easily collapsed by venting the air-inflating gas mixture through the series of aspirator holes 94 and 96. This eliminates the need for vent holes in the air bag, which are frequently provided for that purpose.

Thus, this invention provides directional thrust from a non-directional, thrust-neutral inflator to enable use with a canister having aspirator holes which also function as air bag pressure relief vents. While only a preferred embodiment has been illustrated and described, obvious modifications thereof are contemplated within the scope of this invention and the following claims.

We claim:

1. An air bag assembly comprising:

an inflatable air bag having a central opening;

a thrust neutral inflator for generating pressure gas and having a cylindrical casing with a plurality of diametrically opposed gas discharge holes for discharging the gas in diametrically opposed directions to inflate the air bag;

a reaction canister housing the inflator and having a part-cylindrical bottom wall terminating in upstanding side walls and including end walls closing the ends of the side and bottom walls, and the inflator being mounted on the end walls, and the side and end walls defining a canister gas discharge opening remote from the inflator and having the central opening of the air bag mating therewith so that gas discharged from the inflator travels upwardly through the canister and out through the canister discharge opening into the air bag via the central opening;

a plurality of aspiration holes continuously communicable with ambient air and located in the reaction canister side walls adjacent the gas discharge holes of the inflator such that gas discharged from the inflator is directed at the aspiration holes; and a cylindrical baffle which is mounted in the canister surrounding the inflator and remote and separate from the canister discharge opening and the air bag, the baffle being interposed directly between the inflator and the aspiration holes in the reaction canister side walls to prevent discharging inflator gas from communicating out through the aspiration holes to the ambient air, the baffle being spaced from the inflator and the aspiration holes and having a baffle outlet to direct gas discharged from the inflator away from the aspiration holes and upwardly through the canister and out through the canister discharge opening and into the air bag so that the baffle provides directional thrust from the thrust neutral inflator to enable the use of a thrust neutral inflator with a canister having a plurality of aspiration holes for ambient air aspiration, whereby upon air bag deployment, the directional thrust creates a pressure drop around the baffle such that ambient air is aspirated in through the aspiration holes to augment the volume of gas delivered to the air bag by the inflator.

2. The air bag assembly of claim 1, wherein the baffle includes cylindrical end portions flanking the outlet which engage the ends of the inflator casing.

3. An air bag assembly comprising:

an inflatable air bag;

a thrust neutral inflator for generating pressure gas and having a cylindrical casing with a plurality of diametrically opposed gas discharge holes for discharging the gas in diametrically opposed horizontal directions to inflate the air bag;

a reaction canister housing the inflator and having walls defining a canister outlet for operatively connecting the inflator to the air bag for delivering gas therethrough;

a plurality of aspiration holes continuously communicable with ambient air and located in the reaction canister walls adjacent the gas discharge holes of the inflator such that gas discharged from the inflator is directed at the aspiration holes; and a baffle which is mounted in the canister between the inflator and the reaction canister walls to prevent discharging inflator gas from communicating out through the aspiration holes to the ambient air, the baffle being spaced from the inflator and the aspiration holes to the ambient air and having a baffle outlet to direct gas discharged from the inflator away from the aspiration holes to the canister outlet and a pair of longitudinal wing-like flaps bordering said baffle outlet, whereby upon air bag deployment, pressure drops around the baffle and ambient air is aspirated in through the aspiration holes to augment the volume of gas delivered to the air bag and said wing-like flaps are operable to reduce losses caused by turbulent gas flow.

4. The air bag assembly of claim 3, wherein the baffle is part-cylindrical, is rigid, and is closely spaced from the inflator casing a distance of about 3–5 mils.

\* \* \* \* \*